United States Patent [19]
O'Halloran et al.

[11] Patent Number: 6,047,532
[45] Date of Patent: Apr. 11, 2000

[54] LONG SPAN AUGER SUPPORT APPARATUS FOR HARVESTING HEADER

[75] Inventors: Michael O'Halloran, Hesston; Dwight E. Nickel, Newton, both of Kans.

[73] Assignee: Hay & Forage Industries, Hesston, Kans.

[21] Appl. No.: 08/897,472

[22] Filed: Jul. 21, 1997

[51] Int. Cl.[7] .................................................. A01D 61/00
[52] U.S. Cl. ........................... 56/16.4 A; 56/95; 56/110; 460/114
[58] Field of Search ........................... 56/110, 85, 95, 56/16.4 C, 16.4 A, 16.4 B, 6, 1; 460/114, 116, 119, 9, 1

[56] References Cited

U.S. PATENT DOCUMENTS

| | | | |
|---|---|---|---|
| 1,295,255 | 2/1919 | Baird ........................................ | 56/110 |
| 3,037,613 | 6/1962 | Harmon . | |
| 3,272,317 | 9/1966 | Kelly . | |
| 3,820,860 | 6/1974 | Stone . | |
| 3,919,830 | 11/1975 | Gerber .................................... | 56/95 X |
| 4,384,643 | 5/1983 | Cone . | |
| 4,637,201 | 1/1987 | Pruitt et al. .......................... | 56/16.4 B |
| 5,673,543 | 10/1997 | Richardson et al. ...................... | 56/85 |

OTHER PUBLICATIONS

New Holland Brochure No. FBM '98, entitled "New! Self–Propelled Windrowers—HW300 HW320" (Publication Date believed to be 1998).

Sperry New Holland brochure No. 31110035–8–84 L.V.D., entitled "Self–Propelled Windrowers for Hay and Grain" (Publication Date believed to be 1984).

*Primary Examiner*—H. Shackelford
*Attorney, Agent, or Firm*—Hovey, Williams, Timmons & Collins

[57] ABSTRACT

A crop harvesting header includes a wide cutter for severing crop across a relatively large cutting width, and framework defining a discharge opening spaced rearwardly from the cutter. The discharge opening has a width that is less than the cutting width such that crop severed laterally outboard of the discharge opening by the cutter must be conveyed inwardly before passing through the opening. At least one laterally extending, rotatable auger is located between the cutter and discharge opening for converging severed crop centrally from the areas located laterally outboard of the discharge opening and to project the crop through the opening when rotated. The header includes an auger support for rotatably supporting the auger between its opposite ends on the header framework so that the auger is capable of spanning the long distance corresponding to the large cutting width defined by the sickle bar.

23 Claims, 4 Drawing Sheets

LONG SPAN AUGER SUPPORT APPARATUS FOR HARVESTING HEADER

BACKGROUND OF THE INVENTION

1. Field of the Invention

The present invention relates generally to crop harvesting machines, such as windrowers or windrower-conditioners. More particularly, the present invention concerns the long spanning augers for centralizing and evenly distributing severed crop as it moves rearwardly to the relatively shorter conditioning rolls, and supports for supporting the long spanning augers between their respective opposite ends without interfering with the flow of crop between the augers.

2. Discussion of the Prior Art

Harvesting machines, which are variously referred to as windrowers or windrower-conditioners, have traditionally employed a cutter for severing a swath of crop having a width generally equal to that of the machine. An exemplary showing of a windrower-conditioner is made in U.S. Pat. No. 4,637,201, entitled WIDE-CUT WINDROWER-CONDITIONER HAVING UNIFORM CROP DISTRIBUTION AND CONDITIONING, assigned of record to the assignee of the present invention. Of course, it would be desirable to decrease the time it takes a farmer to harvest a field with the harvesting machine. If the cutter of the harvester is widened so that a wider swath of crop is taken by the machine as it moves across a field, the farmer can make relatively fewer passes across a field and thereby harvest a field in less time, assuming the machine has the capacity to condition and windrow the additional crop severed by the wide cutter. However, conventional harvesting machines have several limitations which restrict increasing the width of cut taken by the machine.

For example, the severed crop must be converged centrally to form a relatively narrow windrow to be picked up later by another machine, such as a hay baler or wagon. The windrow width must not be larger than the width of pickups on these machines, or the farmer will have to make more than one pass across the field to pick up a single windrow. Accordingly, the windrower must include structure for converging the crop from the wide swath taken by the cutter to the narrow windrow deposited on the ground. Some machines simply include rearwardly converging windrow-forming shields located behind the cutter, which are obviously ineffective in forming a uniform windrow when a wide cut is taken by the machine—the sides of the windrow tend to be more dense than the center when only shields are utilized. The demand for wider machines has resulted in the development of powered mechanism for positively feeding the outboard crop centrally; such powered mechanism normally comprising one or more laterally extending augers. As will subsequently be described, there have heretofore been limitations on the length of such augers, thereby placing a restriction on the corresponding width of the machine.

Moreover, when the harvesting machine also performs the function of conditioning the crop, the crop is traditionally passed between a pair of laterally extending, vertically spaced conditioning rolls located behind the converging mechanism. It has been determined that the crop must be uniformly fed to the conditioning rolls, or the crop is unevenly conditioned and consequently dries at irregular rates and the rolls may become damaged. Further, the conditioning rolls on a wide-cut machine are desirably shorter than the cutting width for numerous reasons well appreciated by those of ordinary skill in the art. For example, the conditioned crop is preferably deposited evenly on the ground so as to facilitate uniform drying, and accordingly, it is desirable to reduce or eliminate the need to converge the crop once it has been conditioned.

As mentioned above, one type of mechanism for converging the crop from the cutter to the conditioning rolls comprises a center-gathering auger having a length substantially equal to the cutting width. A pair of bearing assemblies traditionally serve to support the auger at its opposite ends on the header framework. Helical vanes extending inwardly from the opposite ends converge the severed crop centrally from areas located laterally outboard of the conditioning rolls, when the auger is rotated. At first glance, it seems that the length of the auger need only be extended to accommodate a relatively wider cutter. However, as the center-gathering auger is extended, the weight of the auger and corresponding operational loads tend to place undue wear and stress on the bearing assemblies. Moreover, the extended auger may begin to sag between its opposite ends, which could interfere with the operation of the auger or other components of the header and could cause serious damage to the header. Furthermore, it is important that the structure for supporting the auger does not interfere with the flow of crop from the cutter to the conditioning rolls.

In some instances, the harvester may also include a second upwardly spaced auger for evenly spreading the crop across the width of the conditioning rolls so that the crop is uniformly conditioned. Indeed, extending the length of the second auger presents the same problems as those noted above with respect to the center-gathering auger. Particularly, it is extremely important that the structure for rotatably supporting the augers on the header framework does not project into the relatively narrow throat defined between the augers.

OBJECTS AND SUMMARY OF THE INVENTION

Responsive to these and other problems, an important object of the present invention is to provide a harvesting header for attachment to the mobile frame of a harvesting machine, wherein the header is designed to harvest relatively wide swaths of crop as the frame moves across a field (e.g., a header having a cutting width of approximately eighteen feet). Another important object of the present invention is to provide structure for converging the crop behind the cutter, wherein the structure is effective at virtually any length so that the structure does not restrict the width of the cutter. Yet another object of the present invention is to provide one or more long spanning augers for converging crop severed by a forwardly spaced, relatively wide cutter. Along these lines, it is an object of the present invention to provide an auger support for preventing each of the long spanning augers from sagging between its opposite ends and for reducing the risk of bearing assembly overload, without interfering with the rearward flow of crop through the header.

According to these and other objects apparent from the following description of the preferred embodiments, the present invention concerns a harvesting header having a wide cutter that severs a particularly large swath of crop as it is moved across a field so as to reduce the number of passes the farmer must make in a field during harvesting. The header includes at least one long spanning auger having a length corresponding to the width of the cutter for converging the crop as it moves rearwardly through the header. Moreover, a support is provided for rotatably supporting the auger between its opposite ends so as to reduce sag of the auger and prevent overload of either of the bearing assemblies rotatably supporting each end of the auger. Preferably, the support is constructed to function in this manner without interfering with the flow of crop through the header.

If desired, the header may be provided with a second auger for uniformly spreading the crop as it is converged, and a second auger support rotatably supporting the second auger between its opposite ends. Each of the augers preferably comprises a plurality of sections, with an auger support being provided between adjacent sections for rotatably supporting the corresponding abutting ends of the sections. Further, the preferred augers include a stub shaft fixed between adjacent auger sections and rotatably supported by a bearing assembly forming part of the support.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figures 1, 3:
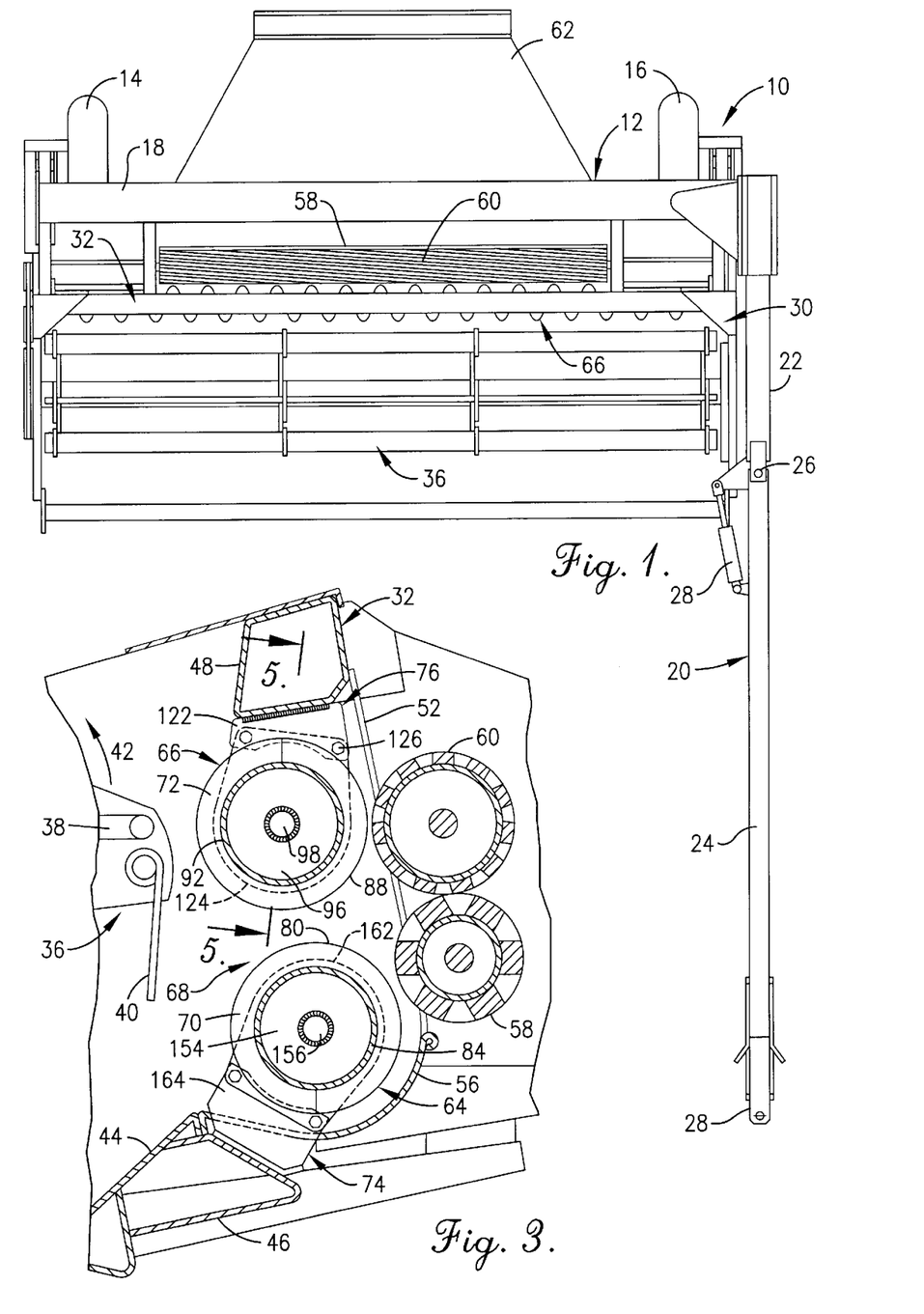
FIG. 1 is a top plan view of a windrower-conditioner constructed in accordance with the principles of the present invention.
FIG. 3 is an enlarged, fragmentary vertical cross-sectional view taken along line 3—3 of FIG. 2, particularly illustrating the throat defined between the augers being devoid of any structure for supporting the augers.

As shown in FIG. 1, the harvesting machine selected for illustration comprises a pull-type windrower-conditioner 10 including a chassis or frame 12 carried by ground wheels 14 and 16 for movement across a field to be harvested. The frame 12 includes a crossbeam 18 and a towing tongue 20 projecting forwardly from one end of the crossbeam 18 for connection to a towing vehicle (not shown). Particularly, the tongue 20 comprises a rear section 22 rigidly attached to the crossbeam 18 and a front section 24 pivotally connected at 26 to the rear section 22 for swinging movement about an upright axis so that the position of the machine 10 may be adjusted relative to the path of travel of the towing vehicle. Note, the machine 10 is shown in a laterally offset position in FIG. 1. In the usual manner, a double acting hydraulic cylinder assembly 28 is pivotally connected between the rear section 22 and front section 24 for remotely controlling the position of the machine 10.

The machine 10 further includes a harvesting header 30 designed to perform a combination of several different, simultaneous operations on a hay crop during a single pass across the field, as will subsequently be described. The header 30 is preferably configured as a modular unit removably connected to the frame 12 for movement across the field therewith. Accordingly, the frame 12 is not dedicated only to those harvesting operations provided by the header 30, but may carry other modular headers designed to perform different harvesting operations. Similarly, the header 30 may be removed from the frame 12 and installed on other variously constructed mobile frames, such as a tractor or prime mover. In this respect, it will be appreciated that the principles of the present invention are equally applicable to self-propelled harvesting machines and machines having a permanent header so as to be dedicated to certain harvesting operations.

Figures 2, 2A:
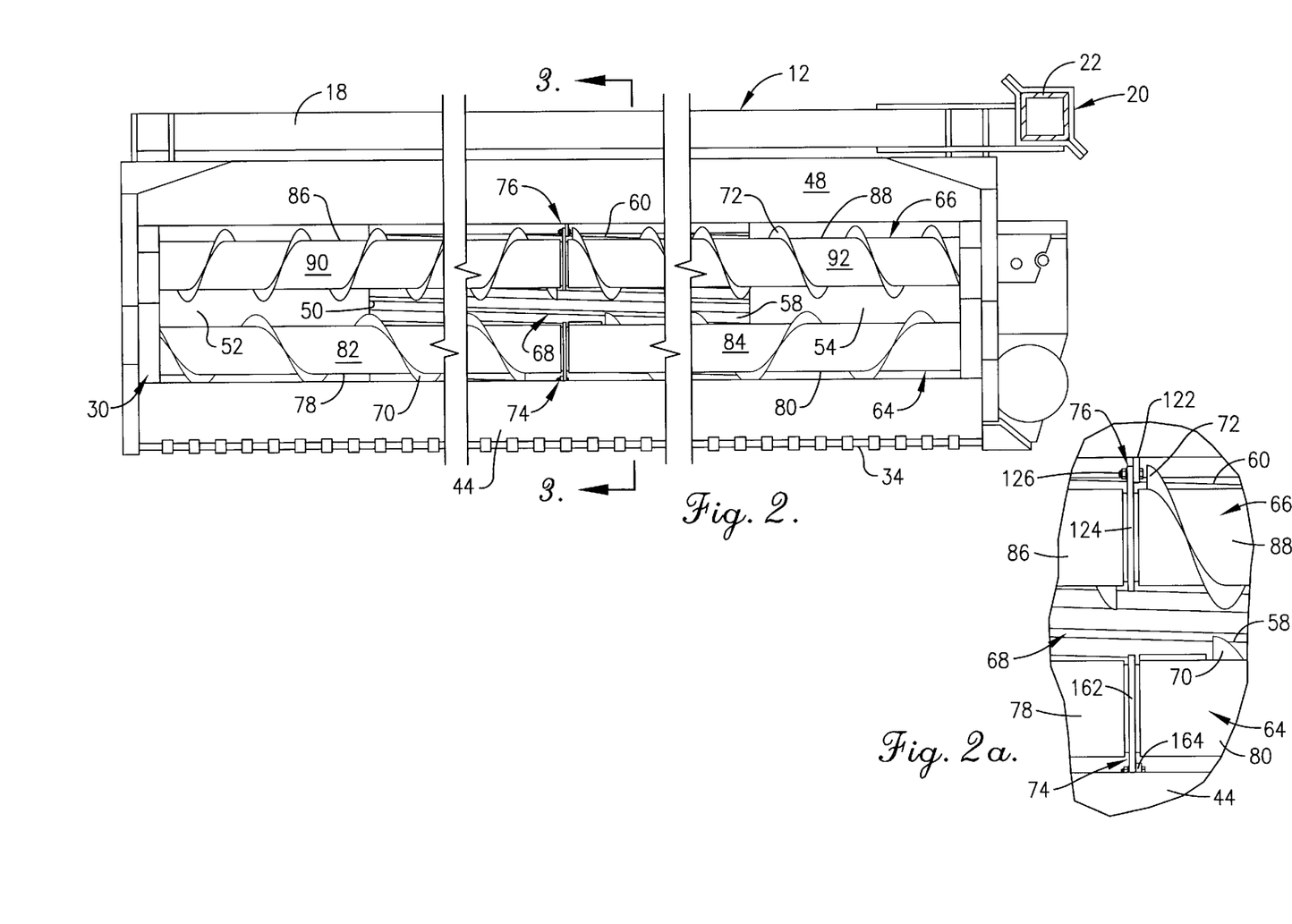
FIG. 2 is an enlarged, fragmentary front elevational view of the machine shown in FIG. 1, with the reel and forward portion of the towing tongue being removed to show details of construction.
FIG. 2a is an enlarged, fragmentary front elevational view of the center portion of the harvesting header, particularly illustrating the supports rotatably supporting the upper and lower augers between their respective opposite ends.

The header 30 includes framework 32 for supporting the various components thereof on the chassis 12. A cutter in the form of a sickle bar 34 (see FIG. 2) is located adjacent the front of the header framework 32 for severing crop as the machine 10 is pulled across a field. It will be appreciated that the cutter may be variously constructed (e.g., the cutter may comprise a plurality of laterally spaced cutting discs). Operation of the sickle bar 34 is assisted by a transversely extending reel 36 supported by the framework 32 above the sickle bar 34 for rotational movement about a horizontal axis. As shown in FIGS. 1 and 3, the reel 36 includes a plurality of circumferentially spaced bats 38 and crop-engaging tines 40 for conveying the crop rearwardly in the usual manner. Particularly, rotation of the reel 36 in the direction of arrow 42 (see FIG. 3) causes upstanding crop to be propelled over the sickle bar 34 to ensure severance thereof, and crop severed by the sickle bar 34 to be moved along a platform 44 extending upwardly and rearwardly from the sickle bar 34.

The header framework 32 includes a lower crossbeam 46 for supporting the rear portion of the platform 44, and a similar upper crossbeam 48 spaced upwardly from the lower crossbeam 46. A discharge opening 50 is defined by the header framework 32 at the rear extremity of the platform 44 in the usual manner. Particularly, the crossbeam 48 defines the upper boundary of the discharge opening 50, while a pair of substantially vertical rear walls 52 and 54 (see FIG. 2) are disposed on opposite sides of the opening 50. A concave, transversely extending pan 56 projects forwardly from the bottom of the rear walls 52 and 54, with the rearmost extremity of the pan 56 defining the lower boundary of the opening 50.

As perhaps best shown in FIG. 3, a pair of laterally extending crop conditioning rolls 58 and 60 are supported by the header framework 32 in and immediately behind the discharge opening 50 for rotation about respective, vertically spaced horizontal axes, with the lower roll 58 being driven in a clockwise direction and the upper roll 60 being driven in a counterclockwise direction by mechanism (not shown). In the conventional manner, the rolls 58,60 are yieldably biased toward one another to present a biting nip therebetween that is operable to receive crop from the opening 50 and propel the same rearwardly into windrow forming shields 62 (see FIG. 1).

It is readily apparent from the drawings that the width of the discharge opening 50, which corresponds generally to the length of the conditioning rolls 58,60, is less than the cutting width defined by the sickle bar 34. Accordingly, the header 30 is provided with powered mechanism between the sickle bar 34 and relatively shorter conditioning rolls 58,60 for inwardly gathering crops which have been severed in front of and laterally outboard of the discharge opening 50 (i.e., in front of the rear walls 52 and 54) and for distributing the crop uniformly along the width of the opening 50 before projecting it rearwardly to the conditioning rolls 58,60. In the illustrated embodiment, this mechanism comprises a laterally extending, rotatable center-gathering auger 64 disposed within the pan 56, and a laterally extending, rotatable distributing auger 66 spaced upwardly from the center-gathering auger 64. The augers 64 and 66 cooperate to define a throat 68 therebetween through which crop passes as it travels from the sickle bar 34 to the conditioning rolls 58,60. As perhaps best shown in FIG. 2, the center-gathering auger 64 is provided with helical converging vanes 70 of opposite inclination on either side of the midpoint of the auger, and the distributing auger 66 is provided with similar helical distributing vanes 72. It will be noted that the converging vanes 70 have a greater pitch than the distributing vanes 72 (see FIG. 2); that is, there are more distributing vanes for a given unit of auger length than converging vanes.

The augers 64 and 66 have coequal lengths corresponding generally to the cutting width defined by the sickle bar 34 so as to extend laterally outwardly beyond the lateral extremities of the discharge opening 50. Accordingly, rotation of the center-gathering auger 64 in a clockwise direction (when viewing FIG. 3) causes crop received from the platform 44 to move upwardly and rearwardly over the top of the auger 64 into the throat 68. The portions of the center-gathering auger 64 located directly in front of the rear walls 52 and 54 converge severed crop centrally from the areas located laterally outboard of the discharge opening 50 (i.e., from the areas located directly in front of the rear walls 52 and 54). Similarly, the distributing auger 66 rotates in a counterclockwise direction (when viewing FIG. 3) to assist the center-gathering auger 64 with converging the crop toward the center of the discharge opening 50. Further, the augers 64,66 cooperate to project the crop through the discharge opening 50 and to the conditioning rolls 58,60. However, as those ordinarily skilled in the art will appreciate, the primary purpose of the distributing auger 66 is to spread, disseminate and gently distribute the crop as it passes through the throat 68 so that the flow of crop is as even as possible across the width of the discharge opening 50 for facilitating uniform conditioning by the conditioning rolls 58,60. The relatively small pitch of the distributing vanes 72 facilitates the spreading action of the distributing auger 66.

As previously indicated, a windrower-conditioner similar in many respects to the illustrated harvesting machine 10 is disclosed in U.S. Pat. No. 4,637,201, which is hereby incorporated by reference to the extent necessary to fully and completely understand the present invention. However, as also indicated above, the conventional harvester shown in the '201 patent is capable of cutting only relatively narrow swaths of crop as it is pulled across a field. The harvester shown in the '201 patent simply does not include structure capable of uniformly converging crop from a wide cutter. It will be appreciated that with the conventional harvester construction shown in the '201 patent, the greatest practical cutting width is sixteen feet. However, with the construction of the present invention, the cutting width of the sickle bar may exceed eighteen feet.

In accordance with the principles of the present invention, each of the augers 64 and 66 is supported generally at its midpoint by a respective support 74 and 76. Although the augers 64 and 66 are journaled at their respective opposite ends to the header framework 32 by suitable bearing assemblies (not shown) in the usual manner, the supports 74 and 76 allow the augers 64 and 66 to span the relatively large cutting width defined by the sickle bar 34, without encountering the problems noted above with respect to conventional harvesting machines. Particularly, the supports 74 and 76 prevent sagging of the long spanning augers 64 and 66 between their respective opposite ends and reduce the risk of overloading the bearing assemblies (not shown) rotatably supporting the opposite ends of the augers. Moreover, the supports 74 and 76 provide such benefits without interfering with the flow of crop through the header 30, as will be further described hereinbelow.

Figure 4:
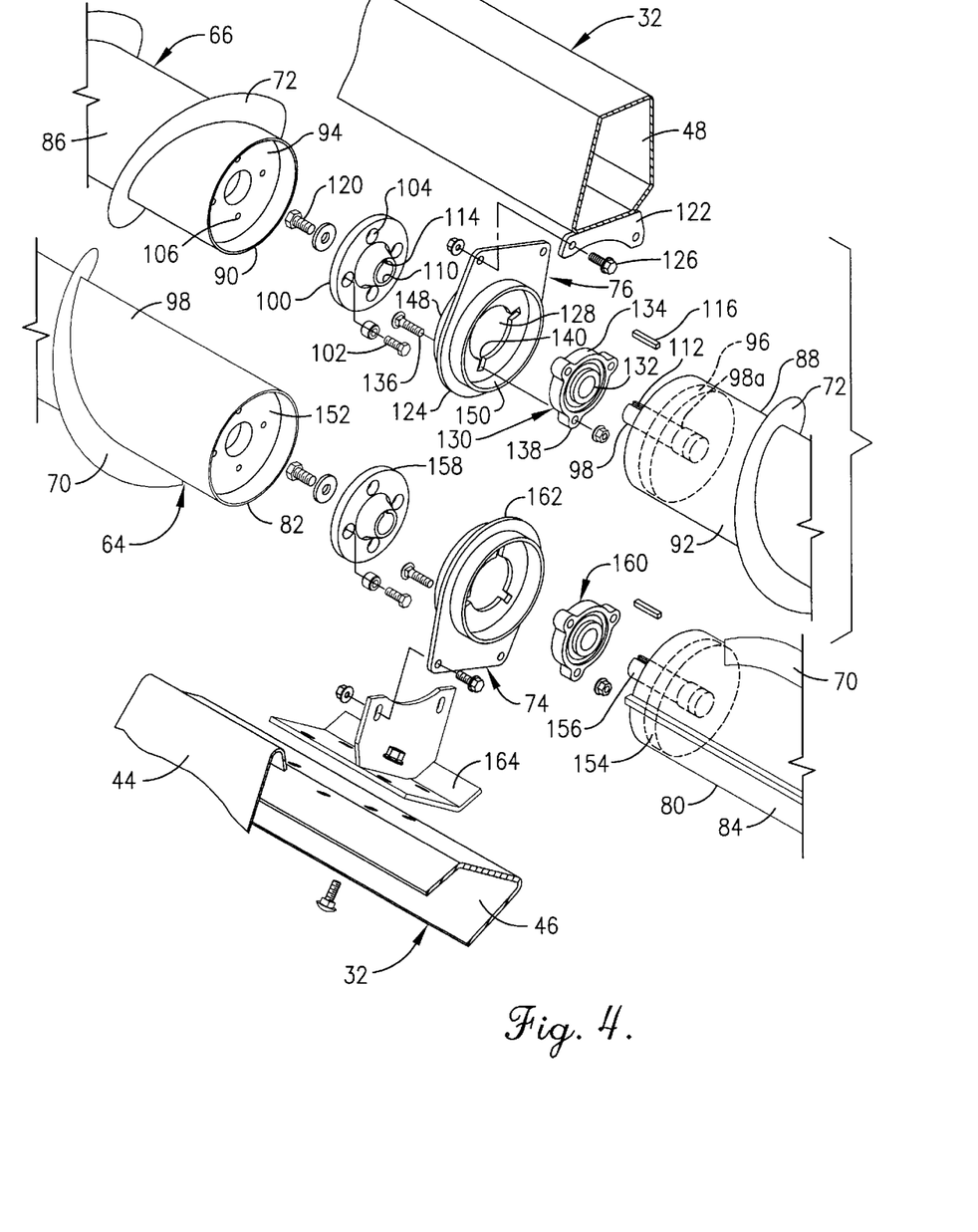
FIG. 4 is an enlarged, fragmentary, exploded perspective view of the center portion of the harvesting header, particularly illustrating constructional details of the augers and supports for rotatably supporting the augers on the header framework.

As perhaps best shown in FIG. 4, the center-gathering auger 64 comprises two auger sections 78 and 80 adjoined at their abutting ends located at the midpoint of the auger 64, with the sections 78 and 80 including hollow cylindrical cores 82 and 84, respectively, cooperating to support the converging vanes 70. The distributing auger 66 likewise comprises a pair of auger sections 86 and 88 including respective hollow cylindrical cores 90 and 92 presenting abutting ends at the midpoint of the auger 66. As will subsequently be described, the supports 74 and 76 rotatably support the abutting ends of the auger sections 78,80 and 86,88, respectively.

Figure 5:
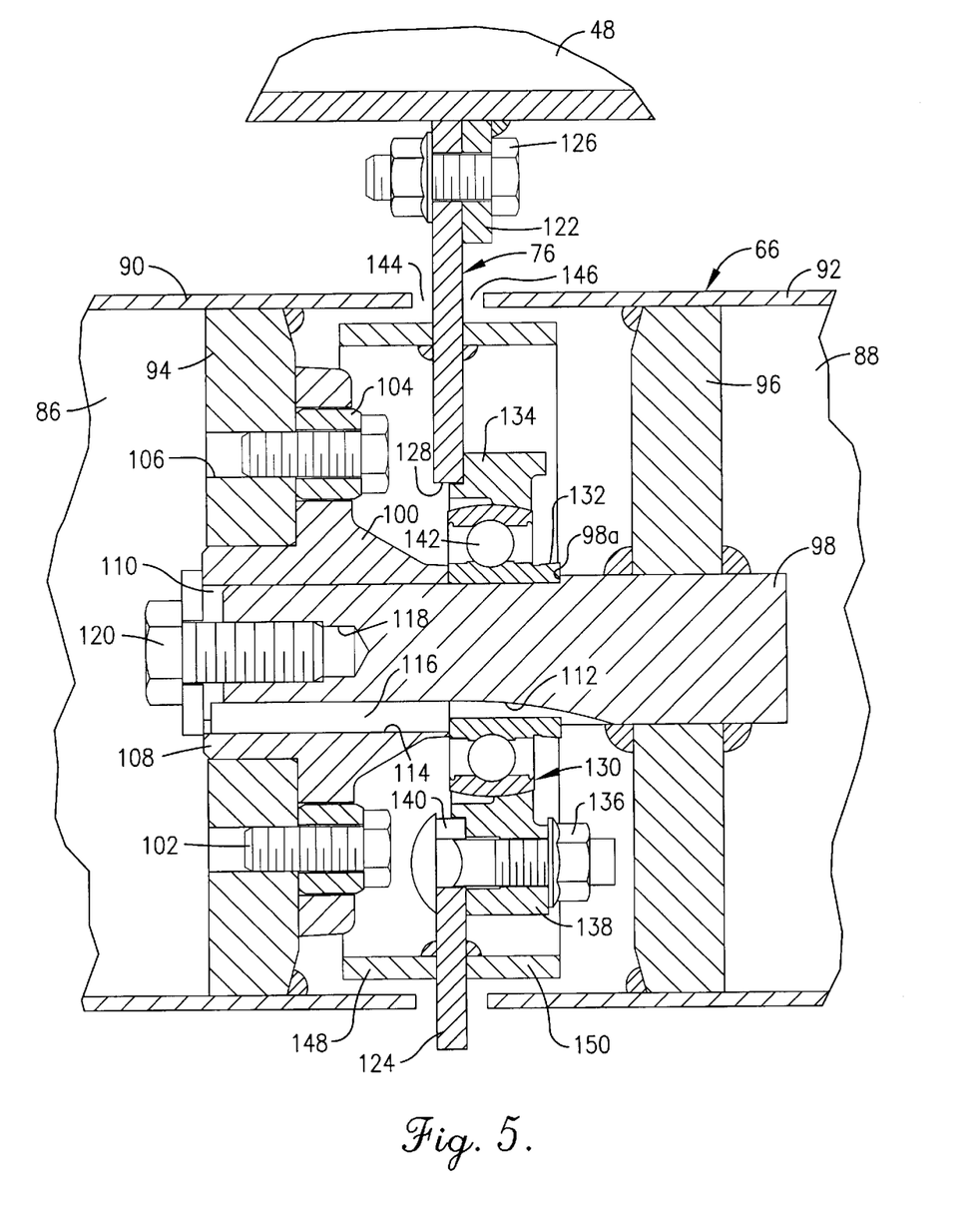
FIG. 5 is an enlarged, fragmentary upright cross-sectional view taken along line 5—5 of FIG. 3, particularly illustrating the upper auger and support in an assembled condition.

Turning particularly to the distributing auger 66 and the support 76, the auger sections 86 and 88 each include a recessed end plate 94 and 96 spaced inwardly from the abutting end of the cylindrical core 90 and 92. As shown in FIG. 5, each of the end plates 94 and 96 is secured to the inside surface of the corresponding cylindrical core 90 and 92 by suitable welds. A stub shaft 98 fixed within a central opening of the right end plate 96 by suitable welds projects leftwardly (when viewing FIG. 5) toward the end plate 94 of the left auger section 88. A collar 100 is secured to the outer face of the left end plate 94 by bolts 102 received in circumferentially spaced openings 104 defined in the collar 100 and corresponding internally threaded holes 106 spaced about the end plate 94. The collar 100 includes a shoulder 108 received within the central opening of the left end plate 94, and a central shaft bore 110 extending therethrough for receiving the stub shaft 98 when the auger sections 86 and 88 are assembled. Keyways 112 and 114 are defined on the outer surface of the shaft 98 and along the shaft bore 110 of the collar 100, respectively, for receiving a key 116 that serves to prevent relative rotational movement between the shaft 98 and collar 100, and thereby the auger sections 86 and 88. The shaft 98 is provided with an axial bore 118 extending inwardly from the leftmost end thereof for threadably receiving a bolt 120 to prevent relative axial shifting of the auger sections 86 and 88. Accordingly, in the illustrated embodiment, relative rotational movement between the auger sections 86 and 88 is prevented so that rotation of one section coincides with rotation of the other.

As perhaps best shown in FIGS. 4 and 5, the support 76 includes a mounting plate 122 secured by suitable welds to the underside of the upper crossbeam 48 of the header framework 32. A horseshoe-shaped support bracket 124 depends from the mounting plate 122 and is fastened thereto by a pair of bolt assemblies 126. The bracket 124 has a central opening 128 that accommodates the shaft 98 and collar 100. A bearing assembly 130 serves to rotatably support the shaft 98 on the support bracket 124. Particularly, the bearing assembly 130 includes an inner race 132 secured to the stub shaft 98 by frictional interengagement therebetween. It will be noted that the inner race 132 is prevented from shifting along the shaft 98 by the rightwardmost end of the collar 100 and a small shoulder 98a defined along part of the circumference of the shaft. An outer race 134 of the bearing assembly is fastened to the support bracket 124 by bolt assemblies 136 received within circumferentially spaced, apertured ears 138 of the outer race 134 and grooves 140 projecting radially outwardly from the central opening 128 of the bracket 124. A ball bearing race 142 disposed between the inner race 132 and outer race 134 allows rotational movement therebetween. Accordingly, the stub shaft 98 is journaled for rotational movement on the support bracket 124 such that the auger sections 86 and 88 are rotatably supported by the bracket 124.

It will be appreciated that although the ends of the auger sections 86 and 88 rotatably supported by the support 76 have been referred to herein as "abutting", these ends do not actually contact one another because the support bracket 124 extends between the sections. Accordingly, small gaps 144 and 146 are defined between the support bracket 124 and ends of the auger sections 86 and 88, respectively, so that the sections may rotate relative to the bracket. In this respect, a pair of rings 148 and 150 project from opposite sides of the support bracket 124 to effectively "close off" the corresponding gaps 144 and 146. That is, the rings 148 and 150 restrict trash and debris from passing through the small gaps 144 and 146. It may also be said that the rings 148 and 150 cooperate with the portions of the cylindrical cores 90 and 92 projecting outwardly beyond the end plates 94 and 96 to prevent ingress of trash and debris into the space defined between the end plates 94 and 96. This will, of course, reduce the risk of damage caused by contamination from trash and debris to the various components within this space (particularly the bearing assembly 130). It will be noted that the rings 148 and 150 are concentric with the central opening 128 and may be connected to the bracket 124 by suitable means, such as the welds shown in FIG. 5.

The center-gathering auger 64 and corresponding support 74 have constructions nearly identical to the distributing auger 66 and upper support 76 and therefore will not described in detail herein. Suffice it to explain that the center-gathering auger 64 includes a pair of recessed end plates 152 and 154 fixed to the auger sections 78 and 80, respectively, at locations spaced inwardly from the abutting ends (see FIG. 4). A stub shaft 156 fixed to the right end plate 154 is rigidly connected to a collar 158 fastened to the left end plate 152 for preventing relative rotational movement between the auger sections 78 and 80. A bearing assembly 160 serves to rotatably support the stub shaft 156, and thereby the auger sections 78 and 80, on a support bracket 162 which is in turn secured to the header framework 32 by a T-shaped mounting plate 164 fastened to the lower crossbeam 46.

As perhaps best shown in FIG. 3, the supports 74 and 76 do not project into the throat 68; that is, the throat 68 is substantially devoid of the structure for rotatably supporting the augers 64 and 66 between their respective opposite ends. Particularly, the lower support 74 projects upwardly from the lower crossbeam 46 of the header framework 32 to the center-gathering auger 64, but terminates generally at the upper boundary of the center-gathering auger 64. In other words, the uppermost extremity of the support 74 (i.e., the top edge of the support bracket 162) is spaced vertically between the cylindrical cores 82,84 and the outer edge of the converging vanes 70. The upper support 76 projects downwardly from the crossbeam 48 to the distributing auger 66, but similarly terminates substantially at the lower boundary of the auger 66 so as to avoid projecting into the throat 68. Accordingly, the supports 74 and 76 do not interfere with crop flowing through the throat 68 from the cutter 34 to the conditioning rolls 58,60.

Operation

As the machine 10 is pulled across a field of standing crop, the wide sickle bar 34 severs the crop, assisted by the reel 36, and the severed crop is swept upwardly and rearwardly along the platform 44 by the tines 40 to the lower center-gathering auger 64. There the materials are gently lifted up and over the auger 64, partly due to the vanes 70, the rotation of the reel 36, and the forward momentum of the machine 10. Further, the crop severed by the sickle bar 34 outboard of the discharge opening 50 and conditioning rolls 58,60 is conveyed inwardly toward the center of the machine primarily by the converging vanes 70, although the distributing auger 66 assists with this movement. It will be appreciated that the pan 56 prevents the crop from simply falling downwardly below the center-gathering auger 64 and exiting the harvester 10 before being conditioned by the rolls 58,60. The overhead distributing auger 66 serves to evenly spread and distribute the crop as it passes through the throat 68 so that a uniform mat of crop is projected through the discharge opening 50 and to the conditioning rolls 58,60. Consequently, the windrow formed downstream from the conditioning rolls 58,60 by the shields 62 has a more uniform density and shape and comprises evenly conditioned crop.

Moreover, because of the inventive construction of the augers 64,66 and supports 74,76, the harvester 10 may employ a relatively wide sickle bar 34 so as to reduce the number of passes required to harvest a field. With the supports 74 and 76, the augers 64 and 66 uniformly converge the severed crop, regardless of the cutting width defined by the sickle bar 34. Additionally, the augers 64 and 66 are capable of spanning the long distance corresponding to the large cutting width without sagging or causing bearing assembly overload. The supports 74 and 76 prevent these problems without interfering with the flow of crop through the harvesting header 30.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the auger supports may be offset from the midpoints of the respective augers, with the supports of the respective augers, with the supports being offset to the same side, opposite sides, or different amounts from the midpoints, if so desired. Further, the augers may comprise more than two sections such that there are a plurality of supports associated with each auger for supporting the abutting ends of each pair of adjacent auger sections. The principles of the present invention are also equally applicable to a harvesting header having only a single center-gathering auger supported on or suspended from the header framework (i.e., a header without a distributing auger).

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A wide cut crop harvesting header configured for attachment to the mobile frame of a harvesting machine, said header comprising:

a wide cutter for severing crop across a cutting width as the machine moves across a field;

header framework defining a discharge opening spaced rearwardly from the cutter, said discharge opening having a width that is relatively less than the cutting width;

a pair of vertically spaced, oppositely rotatable, laterally extending augers located between the cutter and the discharge opening and configured to cooperatively converge severed crop centrally from areas located laterally outboard of the discharge opening and project the crop through the opening when rotated, said augers cooperatively defining a laterally extending open throat therebetween through which the severed crop passes during movement to the discharge opening, each of said augers being rotatably supported adjacent opposite ends thereof; and a pair of intermediate auger supports, each rotatably supporting one of the augers between said opposite ends on the header framework, the auger support for the upper auger supporting the upper auger from above the upper auger without projecting substantially down into the throat, the auger support for the lower auger supporting the lower auger from below the lower auger without projecting substantially up into the throat such that the supports do not obstruct crop flow through the throat.

2. A crop harvesting header as claimed in claim 1; and a pair of laterally extending, oppositely rotatable crop conditioning rolls located behind the discharge opening in disposition for receiving crop projected through the opening by the augers.

3. A crop harvesting header as claimed in claim 1, said header framework including a lower portion spaced downwardly from the augers and an upper portion spaced upwardly from the augers, said supports projecting inwardly from adjacent portions of the header framework to respective ones of the augers, but terminating generally at the throat so that the supports do not interfere with the flow of severed crop to the discharge opening.

4. A crop harvesting header as claimed in claim 3, said supports being spaced substantially equally spaced from the opposite ends of the corresponding augers for providing support generally at the center of the augers.

5. A crop harvesting header as claimed in claim 3, each of said augers comprising a plurality of sections cooperating to converge the crop and project the same through the discharge opening, with adjacent auger sections presenting abutting ends, each of said supports rotatably supporting the abutting ends of adjacent auger sections, such that there is one of said supports associated with each of said adjacent auger sections of the corresponding auger.

6. A crop harvesting header as claimed in claim 5, said auger sections of each of said augers being fixed to one another for preventing relative rotational movement therebetween so that rotation of one of the auger sections coincides with rotation of the other auger sections of the auger.

7. A crop harvesting header as claimed in claim 6, each of said supports comprising a support bracket secured to the adjacent portion of the header framework and a bearing assembly fixed to the support bracket, each of said augers including a stub shaft fixed between adjacent auger sections and rotatably supported by the bearing assembly.

8. A crop harvesting header as claimed in claim 1, said augers being arranged in a generally stacked relationship to present a lower auger and an upper auger, said lower auger being provided with helical converging vanes disposed to converge the severed crop centrally from the areas located laterally outboard of the discharge opening, said upper auger being provided with helical distributing vanes disposed to engage the crop as it passes through the throat and uniformly spread the crop across the discharge opening as the augers rotate.

9. A crop harvesting header as claimed in claim 8, said converging vanes having a greater pitch than the distributing vanes.

10. A crop harvesting header as claimed in claim 1, said augers being of equal length.

11. A crop harvesting header as claimed in claim 10, said length of the augers being substantially equal to the cutting width.

12. A crop harvesting machine comprising:

a mobile frame; and a wide cut harvesting header carried by the frame for performing operations on a crop as the machine moves across a field, said header comprising wide cutter for severing crop across a cutting width as the machine moves across a field, header framework defining a discharge opening spaced rearwardly from the cutter, said discharge opening having a width that is relatively less than the cutting width, a pair of vertically spaced, oppositely rotatable, laterally extending augers located between the cutter and the discharge opening and configured to cooperatively converge severed crop centrally from areas located laterally outboard of the discharge opening and project the crop through the opening when rotated, said augers cooperatively defining a laterally extending open throat therebetween through which the severed crop passes during movement to the discharge opening, each of said augers being rotatably supported adjacent opposite ends thereof; and a pair of intermediate auger supports, each rotatably supporting one of the augers between said opposite ends on the header framework, the auger support for the upper auger supporting the upper auger from above the upper auger without projecting substantially down into the throat, the auger support for the lower auger supporting the lower auger from below the lower auger without projecting substantially up into the throat such that the supports do not obstruct crop flow through the throat.

13. A crop harvesting machine as claimed in claim 12, said harvesting header including a pair of laterally extending, oppositely rotatable crop conditioning rolls located behind the discharge opening in disposition for receiving crop projected through the opening by the augers.

14. A crop harvesting machine as claimed in claim 12, said header framework including a lower portion spaced downwardly from the augers and an upper portion spaced upwardly from the augers, said supports projecting inwardly from adjacent portions of the header framework to respective ones of the augers, but terminating generally at the throat so that the supports do not interfere with the flow of severed crop to the discharge opening.

15. A crop harvesting machine as claimed in claim 14,
said supports being spaced substantially equally from the opposite ends of the corresponding augers for providing support generally at the center of the augers.

16. A crop harvesting machine as claimed in claim 15,
each of said augers comprising a plurality of sections cooperating to converge the crop and project the same through the discharge opening, with adjacent auger sections presenting abutting ends,
each of said supports rotatably supporting the abutting ends of adjacent auger sections, such that there is one of said supports associated with each of said adjacent auger sections of the corresponding auger.

17. A crop harvesting machine as claimed in claim 16,
said auger sections of each of said augers being fixed to one another for preventing relative rotational movement therebetween so that rotation of one of the auger sections coincides with rotation of the other auger sections of the auger.

18. A crop harvesting machine as claimed in claim 17,
each of said supports comprising a support bracket secured to the adjacent portion of the header framework and a bearing assembly fixed to the support bracket,
each of said augers including a stub shaft fixed between adjacent auger sections and rotatably supported by the bearing assembly.

19. A crop harvesting machine as claimed in claim 12,
said augers being arranged in a generally stacked relationship to present a lower auger and an upper auger,
said lower auger being provided with helical converging vanes disposed to converge the severed crop centrally from the areas located laterally outboard of the discharge opening,
said upper auger being provided with helical distributing vanes disposed to engage the crop as it passes through the throat and uniformly spread the crop across the discharge opening as the augers rotate.

20. A crop harvesting machine as claimed in claim 19,
said converging vanes having a greater pitch than the distributing vanes.

21. A crop harvesting machine as claimed in claim 12,
said augers being of equal length.

22. A crop harvesting machine as claimed in claim 21,
said length of the augers being substantially equal to the cutting width.

23. A crop harvesting machine as claimed in claim 12,
said mobile frame including a forwardly extending tongue for attachment to a towing vehicle so that the machine may be pulled across a field.

\* \* \* \* \*